(12) United States Patent
Godwin

(10) Patent No.: US 6,802,009 B1
(45) Date of Patent: Oct. 5, 2004

(54) OPERATING SYSTEM SECURITY CHECKING SYSTEM, METHOD, AND PROGRAM

(75) Inventor: Debbie Ann Godwin, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,734

(22) Filed: Dec. 17, 1999

(51) Int. Cl.[7] .................................................. H04L 9/00
(52) U.S. Cl. ........................ 713/200; 713/1; 713/201; 713/164
(58) Field of Search ........................ 713/2, 200, 202, 713/183, 164

(56) References Cited

U.S. PATENT DOCUMENTS

| | | | |
|---|---|---|---|
| 5,539,877 A | 7/1996 | Winokur et al. | 395/183.02 |
| 5,878,064 A | 3/1999 | Goodwin, III | 371/68.2 |
| 5,958,053 A | 9/1999 | Denker | 713/201 |
| 5,974,549 A | * 10/1999 | Golan | 713/200 |
| 6,058,426 A | * 5/2000 | Godwin et al. | 709/229 |
| 6,070,244 A | * 5/2000 | Orchier et al. | 713/201 |
| 6,446,210 B1 | * 9/2002 | Borza | 713/201 |

* cited by examiner

Primary Examiner—Gilberto Barrón
Assistant Examiner—Kambiz Zand
(74) Attorney, Agent, or Firm—Marilyn Smith Dawkins; Dillon & Yudell LLP (57) ABSTRACT

A data processing system, method, and program are described for monitoring the security of an operating system being executed by the data processing system. A plurality of security requirements are established for utilizing the operating system. A plurality of system parameters are established. And, a plurality of user values are established for each user of the operating system. A determination is made regarding whether each of the plurality of security requirements is met. This determination is made utilizing the plurality of system parameters and the plurality of user values for each user of the operating system. The operating system is deemed to be secure when all of the plurality of security requirements are met. A notice of a security breach is generated in response to a determination that one or more of the plurality of security requirements is not met. A suggested correction is provided for correcting the security breach.

21 Claims, 5 Drawing Sheets

OPERATING SYSTEM SECURITY CHECKING SYSTEM, METHOD, AND PROGRAM

BACKGROUND OF THE INVENTION

1. Technical Field

The present invention relates in general to data processing systems and, in particular, to a data processing system and method for checking the security of an operating system being executed by the data processing system. Still more particularly, the present invention relates to a data processing system and method for checking the security of an operating system being executed by a server computer system utilizing system parameters and user values.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Known systems exist which detect errors that occur during the execution of an application program. Other systems exist which detect errors which occur during the execution of an operating system. Both types of systems detect errors which relate to the execution of either the application program or operating system. None of these systems detect possible breaches in the security of the systems.

Therefore a need exists for a data processing system and method for monitoring the security of a LINUX operating system being executed by the data processing system.

SUMMARY OF THE INVENTION

A data processing system, method, and program are described for monitoring the security of an operating system being executed by the data processing system. A plurality of security requirements are established for utilizing the operating system. A plurality of system parameters are established. And, a plurality of user values are established for each user of the operating system. A determination is made regarding whether each of the plurality of security requirements is met. This determination is made utilizing the plurality of system parameters and the plurality of user values for each user of the operating system. The operating system is deemed to be secure when all of the plurality of security requirements are met. A notice of a security breach is generated in response to a determination that one or more of the plurality of security requirements is not met. A suggested correction is provided for correcting the security breach.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–4B of the drawings, like numerals being used for like and corresponding parts of the accompanying drawings.

The present invention is a security checking tool for monitoring or checking the security of a LINUX operating system being executed by a server computer system. A plurality of security requirements are established for utilizing the operating system. A plurality of system parameters are established. A plurality of user values are also established for each user of the operating system. A system user may be a human being or a computer program or process. A determination is then made regarding whether each of the security requirements is met by utilizing the system parameters and user values. The operating system is deemed to be secure when the security requirements are met.

The security requirements define permitted access to the operating system and may include file values and permissions. As an example, the security requirements may include the following requirements: particular password rules must be implemented, login names must be unique, particular entries must be present, the password file must include a password, and a group identifier must be the same as a user identifier for a particular user.

When a security requirement is not met, a security breach has occurred. The security breach is reported along with a suggested method for correcting the security breach.

The present invention may be implemented in a computer system executing LINUX operating systems available from a variety of different manufacturers and/or distributors. The present invention is capable of reading a configuration file to determine the valid and secure values for the plurality of system parameters.

A user's manual for such a security checking tool is included as Table A. An example start-up script to provide prpogram execution and notification automation is appended as Table B.

Figure 1:
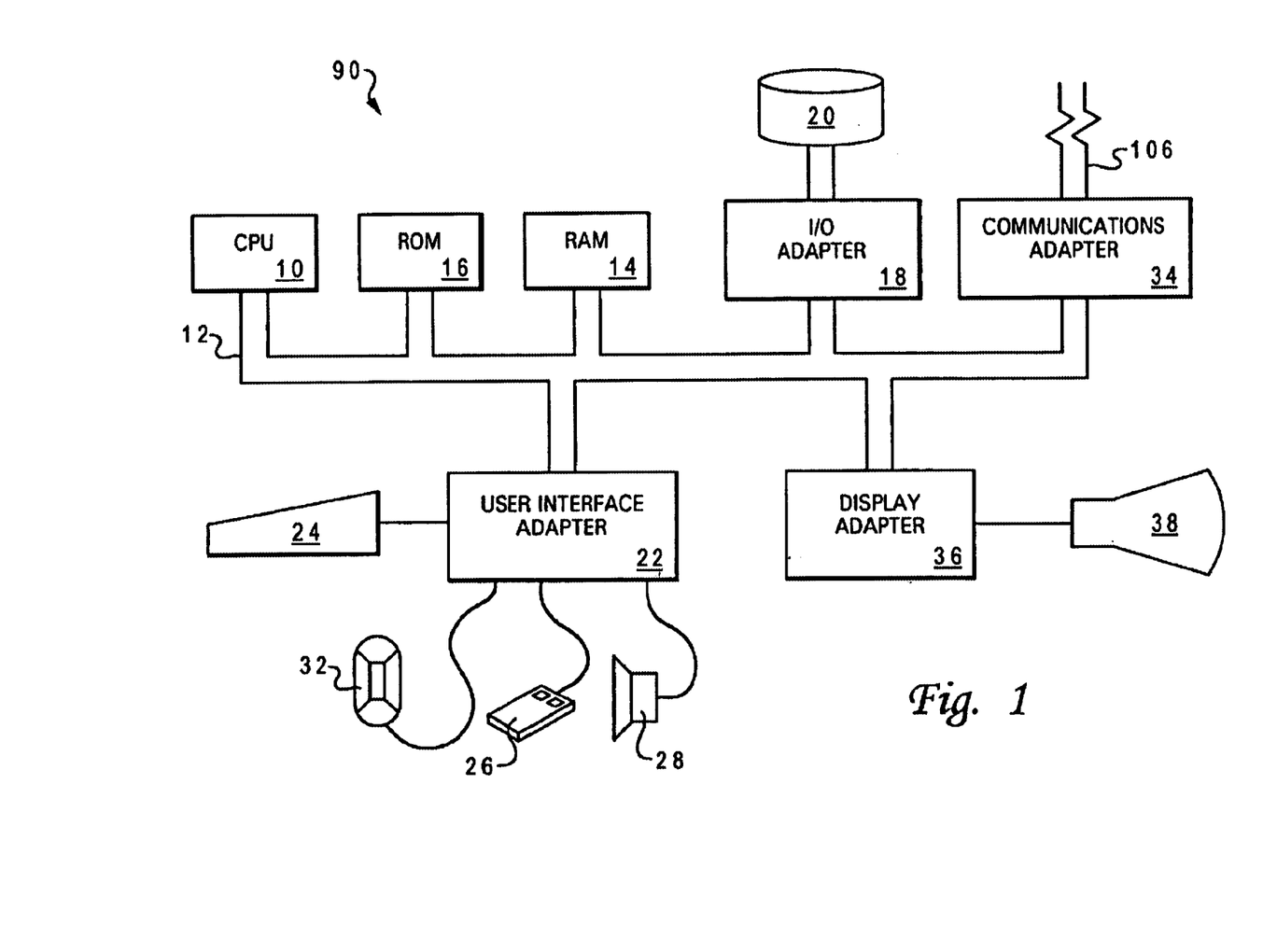
FIG. 1 depicts a pictorial representation of a computer system which may be utilized to implement a server computer system or a client computer system in accordance with the method and system of the present invention.

FIG. 1 depicts a pictorial representation of a computer system which may be utilized to implement a server computer system or a client computer system in accordance with the method and system of the present invention. Those skilled in the art will appreciate that any suitably programmed computer system and LINUX distribution (i.e. Red Hat, Caldera, etc.) may be utilized.

Data processing system 90 includes a central processing unit (CPU) 10. CPU 10 is coupled to system bus 12 to which are attached a random access memory (RAM) 14, a read only memory (ROM) 16, an input/output (I/O) adapter 18, and a user interface adapter 22. RAM 14 provides temporary storage for application program code and data, while ROM 16 typically includes the basic input/output system (BIOS) code.

ROM 16 is also used to store files, values, and routines. For example, ROM 16 is utilized to store a configuration file which includes current values of system parameters, as well as other security files which also include current values of system parameters.

The I/O adapter 18 is coupled to one or more direct access storage drives (DASD's), here represented as a disk drive 20. A disk drive 20 typically stores the computer's operating system (OS) and various application programs, each of which are selectively loaded into RAM 14 via system bus 12.

Data processing system 90 is preferably implemented utilizing a LINUX operating system. Therefore, a server computer system and client computer systems are all utilizing the LINUX operating system. However, those skilled in the art will appreciate that the method and system described below may be utilized in a computer system executing other operating systems.

I/O adapter 18 may support, for example the Integrated Device Electronics (IDE) interface standard or the Small Computer System Interface (SCSI) standard. In the former case, I/O adapter 18 typically will support two disk drives in parallel. The user interface adapter 22 has attached to it a keyboard 24, a mouse 26, a speaker 28, a microphone 32, and/or other user interface devices such as a touch screen device (not shown). A display 38 is connected to system bus 12 via a display adapter 36. A communications adapter 34 is connected to bus 12 and a network 106.

Figure 2:
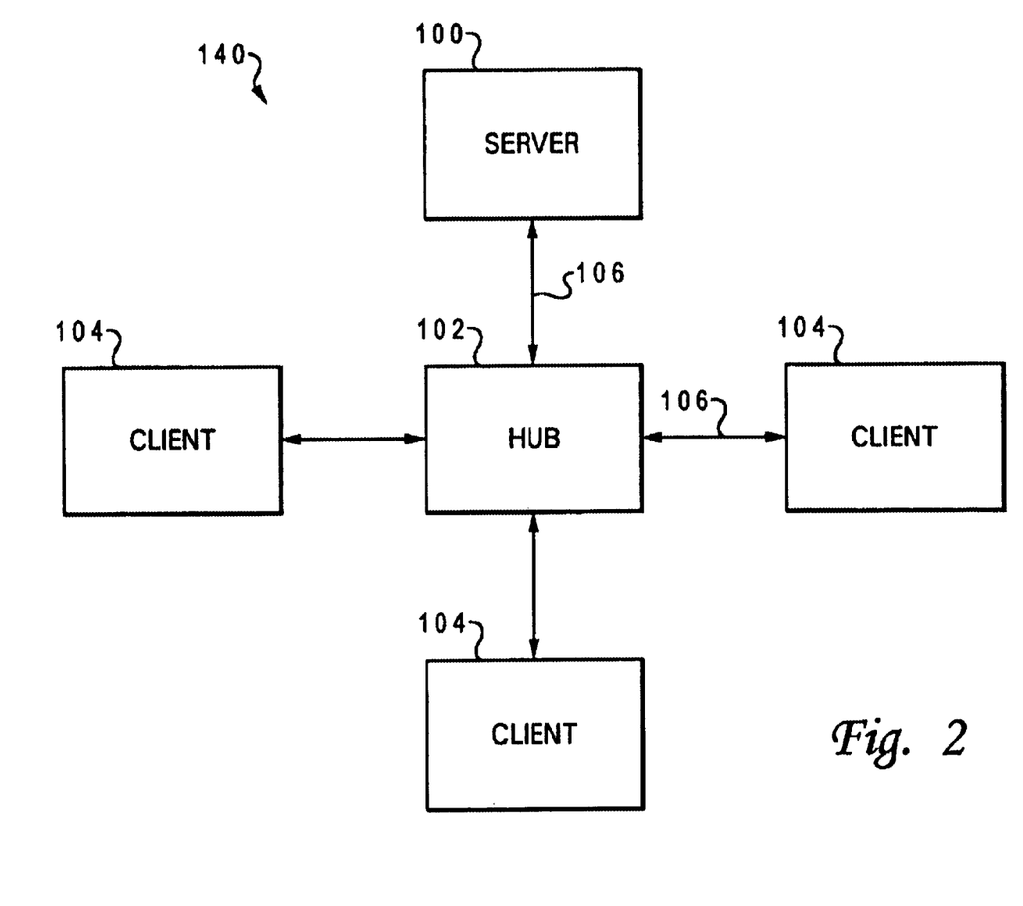
FIG. 2 illustrates a pictorial representation of a network including a plurality of client computer systems coupled to a server computer system utilizing a hub in accordance with the method and system of the present invention.

FIG. 2 illustrates a pictorial representation of a network 140 including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of network 140 conforms to the token ring specification and uses such hubs. It will be appreciated, however, that other forms of networks, such as Ethernet, may be utilized to implement the invention.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing a token ring network.

Figure 3:
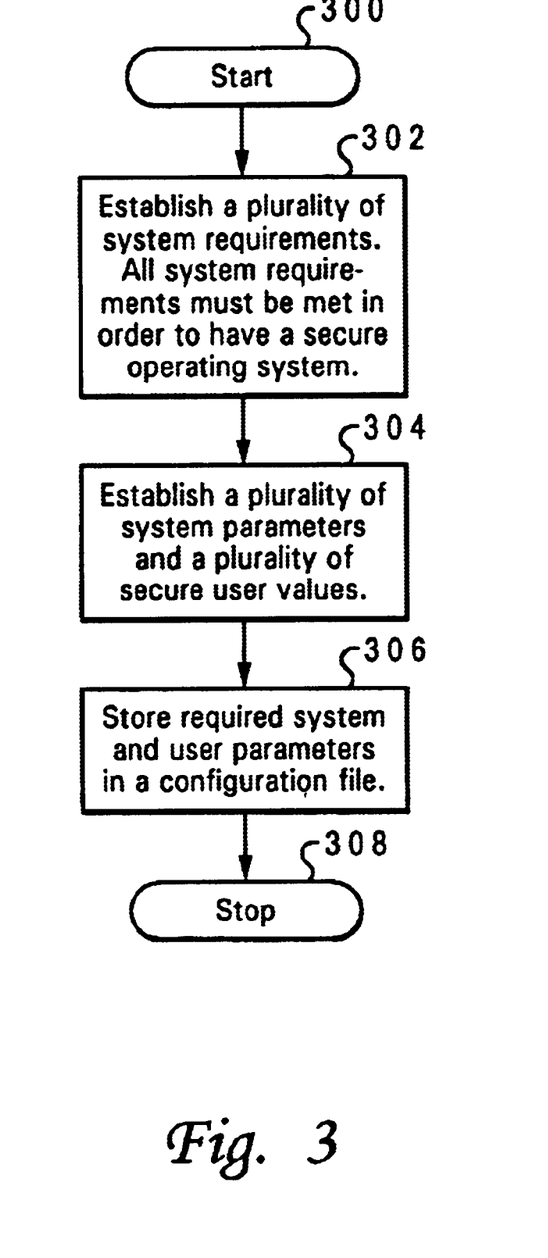
FIG. 3 illustrates a high level flow chart which depicts the establishment of a plurality of system requirements, system parameters, and user values, as well as secure values for each of these user values in accordance with the method and system of the present invention.

FIG. 3 illustrates a high level flow chart which depicts the establishment of a plurality of system requirements, system parameters, and user values, as well as secure values for each of these user values in accordance with the method and system of the present invention. The process starts as depicted at block 300 and thereafter passes to block 302 which illustrates establishing a plurality of system requirements. Each system requirement must be met in order for the operating system to be deemed to be secure. Next, block 304 depicts establishing a plurality of system parameters and a plurality of secure user values. System parameters include parameters such as valid password length, or password expiration days. The process then passes to block 306 which depicts storing the system parameters in a configuration file. The contents of a sample configuration file are detailed in Table C. The process then terminates as illustrated at block 308.

Figure 4A:
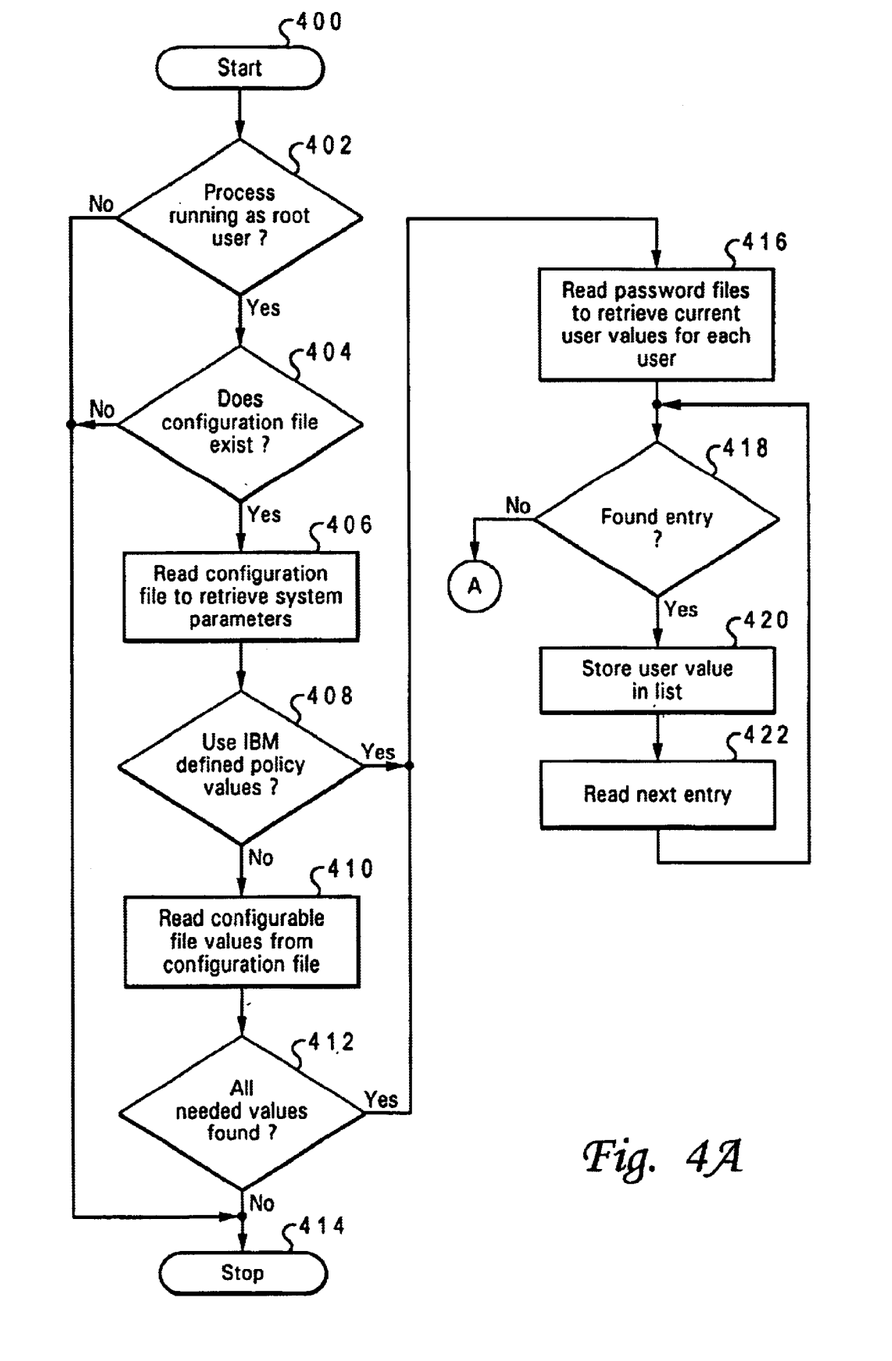
FIGS. 4A and 4B together depict a high level flow chart which illustrates an operating system security checking process in accordance with the method and system of the present invention.
Figure 4B:
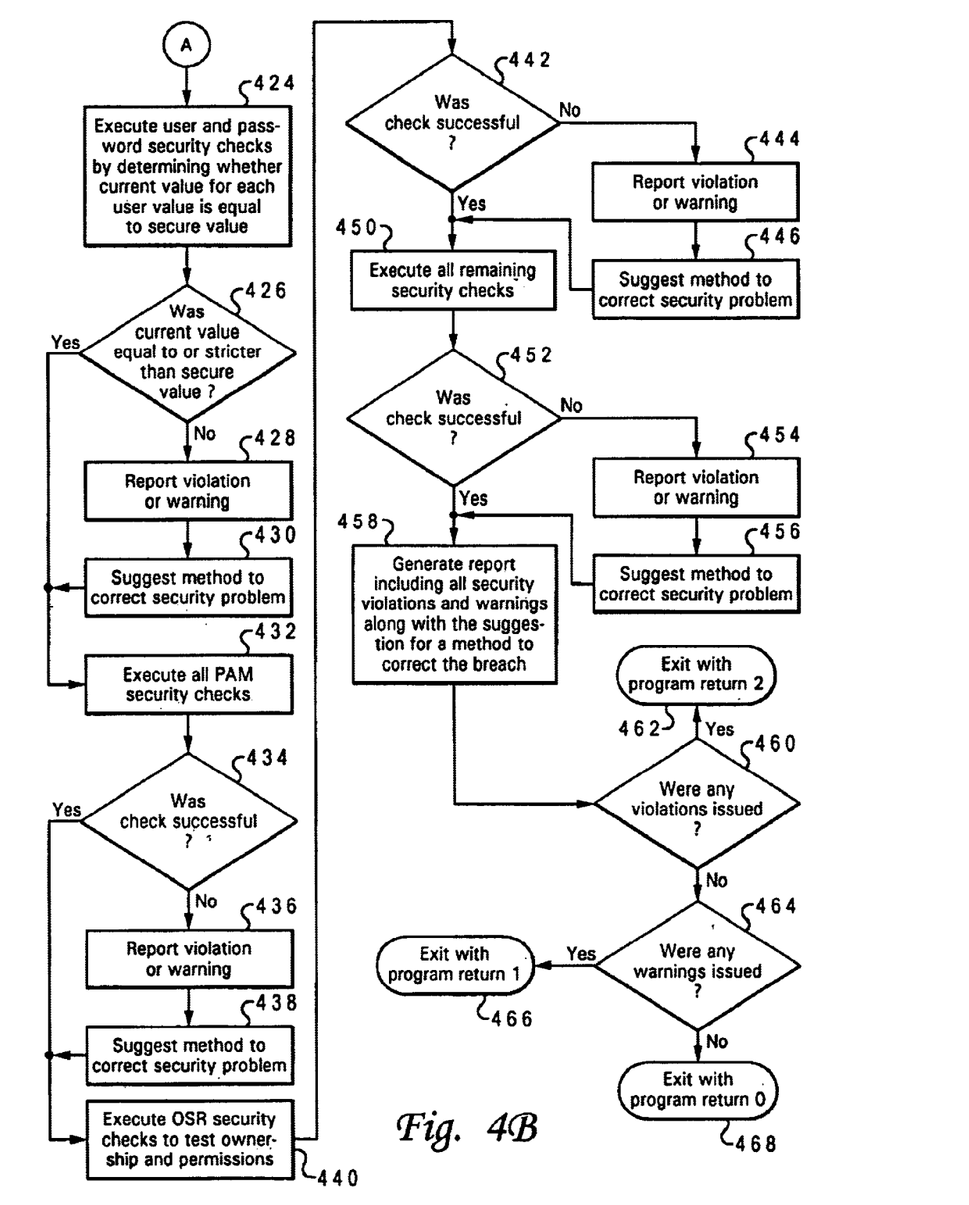

FIGS. 4A and 4B together depict a high level flow chart which illustrates an operating system security checking process in accordance with the method and system of the present invention. The process starts as depicted at 30 block 400 and thereafter passes to block 402 which illustrates a determination of whether or not this security checking method is being executed by the root user. If a determination is made that this method is not being executed by the root user, the process terminates as depicted at block 414. Referring again to block 402, if a determination is made that this method is being executed by the root user, the process passes to block 404 which illustrates a determination of whether or not a configuration file exists within the computer system executing this process. If a configuration file does not exist, the process terminates as depicted at block 414.

Referring again to block 404, if a determination is made that a configuration file does exist, the process passes to block 406 which depicts reading the configuration file to retrieve the current values for system parameters included within the configuration file. Next, block 408 illustrates a determination of whether or not the configuration file included a value indicating IBM policies should be followed during the security checking process. In a preferred embodiment, the present invention performs security checks according to International Business Machine (IBM) Corporation's Security Standards for Providers of Network and Computing Service (Security Standards) which is hereby incorporated by reference. The IBM Corporation's Security Standards establishes security practices for the protection of IBM's information assets on network and computing environments within IBM. The Security Standards also defines the requirements for network infrastructures and system services which support IBM business processing and where the infrastructures and system services are provided to multiple user, including services within the IBM.COM domain. In a preferred embodiment, Operating System Resources (OSR) file and directory, permissions, and owners are verified under the mentioned standard which determines the configuration and security state of the machine.

If a determination is made that the configuration file includes a value indicating IBM policies should not be utilized, the security checking process is being executed on a machine which is not required to follow IBM defined security poly. When the process is being executed on a server machine which is required to follow IBM security policies, a standard set of policies are utilized which include specification of particular system parameters. When the process is being executed on a machine not within IBM, i.e. not following IBM security policies, a set of policies are utilized which are set utilizing system parameters defined within the configuration file. The process passes to block 410 which depicts the reading of the configurable file values from the configuration file. Next, block 412 illustrates a determination of whether or not all of the needed values are found in the configuration file. If a determination is made that not all of the needed values are found in the configuration file, the process terminates as depicted at block 414.

Referring again to block 408, if a determination is made that the configuration file included a value indicating that IBM policies should be followed, the process passes to block 416. Referring again to block 412, if a determination is made that all of the needed values are found in the configuration file, the process passes to block 416.

Block 416 illustrates reading password files to retrieve current user values for each user. Next, block 418 depicts a determination of whether or not any entries including current user values are found. If a determination is made that an entry in a password file is found which includes a current user value, the process passes to block 420 which illustrates the storage of the user value in a list. Next, block 422 depicts reading the next entry in the file. The process then passes to block 418.

Referring again to block 418, if a determination is made that no more entries are found, the list is completed which includes all of the user values to be checked during the security check. The process passes to block 424 which illustrates executing user and password security checks by determining whether the current value for each user value included within the list is equal to or stricter than an established secure value read from the configuration file or set by the programmer per the Security Standards. Thereafter, block 426 depicts a determination of whether or not the current user value is equal to or stricter than the secure user value for each user value for each user. If a determination is made that the current user value is equal to or stricter than the secure user value for each user value for each user, the process passes to block 432.

Referring again to block 426, if a determination is made that a current user value is not equal to a secure user value, the process then passes to block 428 which illustrates the reporting of actual or potential security breaches. A security violation occurs when there is an actual security breach. A security warning occurs when there is a situation which may lead to an actual security breach. Thereafter, block 430 depicts suggesting a method or value for correcting the reported security problem. For example, a suggestion may be made to set the current user value to the secure user value in order to avoid the security breach. The process then passes to block 432.

Block 432 illustrates executing all Pluggable Authentication Modules (PAM) security checks. A check within the present invention verifying the required system authentication policy is set per the Security Standards. Thereafter, block 434 depicts a determination of whether or not each PAM security check was successful. If a determination is made that all PAM security checks were successful, the process passes to block 440.

Referring again to block 434, if a determination is made that a PAM security check was unsuccessful, the process passes to block 436 which illustrates the reporting of either a security violation or warning for each unsuccessful PAM security check. Thereafter, block 438 depicts suggesting a method or value for correcting each reported security problem. The process then passes to block 440.

Block 440 illustrates executing Operating System Resource (OSR) security checks to test file ownership and permission. An OSR security check is defined in the Security Standards. Thereafter, block 442 depicts a determination of whether or not each OSR security check was successful. If a determination is made that all OSR security checks were successful, the process passes to block 450.

Referring again to block 442, if a determination is made that one of the OSR security checks was unsuccessful, the process passes to block 444 which illustrates the reporting of a security violation or warning for each unsuccessful security check. Thereafter, block 446 depicts suggesting a method or value for correcting each reported security problem. The process then passes to block 450.

Block 450 illustrates executing any remaining security checks. Thereafter, block 452 depicts a determination of whether or not each remaining security check was successful. If a determination is made that all remaining security checks were successful, the process passes to block 458.

Referring again to block 452, if a determination is made that one of the remaining security checks was unsuccessful, the process passes to block 454 which illustrates the reporting of each security violation or warning for the unsuccessful security check. Thereafter, block 456 depicts suggesting a method or value for correcting each reported security problem. The process then passes to block 458.

Block 458 illustrates the generation of a report including all security breaches along with the suggestion for a method to correct the security breaches. An example report for a machine having security breaches resulting in reported violations and warnings, where the machine is designed to adhere to the Security Standards, is included as Table D. Machines which are designed to adhere to the Security Standards perform checks based on the policies set forth in the Security Standards.

An example report for a machine having security breaches resulting in reported violations and warnings, where the machine is not designed to adhere to the Security Standards, is included as Table E. Machines which are not designed to adhere to the Security Standards perform checks based on values obtained from the configuration file (see Table C). The process then passes to block 460 which depicts a determination of whether or not any violation were issued. If a determination is made that violations were issued, the process passes to block 462 which illustrates exiting the security checking tool with a program return of "2". A program return of "2" means that the tool will complete execution and report the violations which occurred.

Referring again to block 460, if a determination is made that no violations occurred, the process passes to block 464 which depicts a determination of whether or not any warnings were issued. If a determination is made that warnings were issued, the process passes to block 466 which illustrates exiting the security checking tool with a program return of "1". A program return of "1" means that the tool will complete execution and report the warnings which occurred.

Referring again to block 464, if a determination is made that no warnings occurred, the process passes to block 468 which depicts exiting the security checking tool with a program return of "0". A program return of "0" means that the tool will complete execution and report that no violations or warnings occurred.

The present invention provides many advantages over the prior art. The security checks are completed automatically which leads to significant savings in both time and money. In addition, the present method and system provide a more accurate check of the security of the operating system than manual checks. All breaches are documented along with suggested corrections which provides for the ability to audit the system. Further, the present invention may be implemented on computer systems executing the LINUX operating system available from different manufacturers by setting system parameters in a configuration file.

While a preferred embodiment has been particularly shown and described, it will be understood by those skilled in the art that various changes in form and detail may be made therein without departing from the spirit and scope of the present invention.

What is claimed is:

1. A method in a data processing system executing an operating system, said method comprising the steps of:
    establishing a plurality of security requirements for utilizing said operating system;
    establishing a plurality of system parameters;
    establishing a plurality of user values of said operating system;
    determining whether each of said plurality of security requirements is met utilizing said plurality of system parameters and said plurality of user values, wherein said operating system is secure in response to said plurality of security requirements being met;
    determining a secure value for each of said plurality of user values;
    determining a current value for each of said plurality of user values;
    determining that one of said plurality of security requirements is not met in response to said secure value being unequal to said current value for one of said plurality of user values;
    generating a notice of a security breach for said one of said plurality of security requirements; and
    providing a suggested correction for said security breach wherein said suggested correction results in said current value for said one of said plurality of user values being set to said secure value for said one of said plurality of user values.

2. The method according to claim 1, further comprising the step of generating a notice of a security breach for one of said plurality of security requirements in response to a determination that said one of said plurality of security requirements is not met.

3. The method according to claim 2, wherein the step of generating said notice of a security breach further comprises the step of reporting a security violation in response to a determination that said one of said plurality of security requirements is not met.

4. The method according to claim 2, further comprising the step of providing a suggested correction for said security breach wherein said suggested correction results in said one of said plurality of security requirements being met.

5. The method according to claim 1, further comprising the step of storing said plurality of system parameters in a configuration file.

6. The method according to claim 1, wherein the step of establishing said plurality of security requirements for utilizing said operating system further comprises the step of establishing a security requirement defining a valid access level of said operating system.

7. The method according to claim 1, wherein said operating system being executed by said data processing system is a LINUX operating system.

8. A data processing system executing an operating system, comprising:
    means for establishing a plurality of security requirements for utilizing said operating system;
    means for establishing a plurality of system parameters;
    means for establishing a plurality of user values of said operating system;
    means for determining whether each of said plurality of security requirements is met utilizing said plurality of system parameters and said plurality of user values, wherein said operating system is secure in response to said plurality of security requirements being met;
    means for determining a secure value for each of said plurality of user values;
    means for determining a current value for each of said plurality of user values;
    means for determining that one of said plurality of security requirements is not met in response to said secure value being unequal to said current value for one of said plurality of user values
    means for generating a notice of a security breach for said one of said plurality of security requirements; and
    means for providing a suggested correction for said security breach wherein said suggested correction results in said current value for said one of said plurality of user values being set to said secure value for said one of said plurality of user values.

9. The system according to claim 8, further comprising means for generating a notice of a security breach for one of said plurality of security requirements in response to a determination that said one of said plurality of security requirements is not met.

10. The system according to claim 9, wherein said means for generating said notice of a security breach further comprises means for reporting a security violation in response to a determination that said one of said plurality of security requirements is not met.

11. The system according to claim 9, further comprising means for providing a suggested correction for said security breach wherein said suggested connection results in said one of said plurality of security requirements being met.

12. The system according to claim 8, further comprising means for storing said plurality of system parameters in a configuration file.

13. The system according to claim 8, wherein said means for establishing said plurality of security requirements for utilizing said operating system further comprises means for establishing a security requirement defining a valid access level of said operating system.

14. The system according to claim 8, wherein said operating system being executed by said data processing system is a LINUX operating system.

15. A computer program product being executed within a data processing system executing an operating system, comprising:
    instruction means for establishing a plurality of security requirements for utilizing said operating system;
    instruction means for establishing a plurality of system parameters;
    instruction means for establishing a plurality of user values of said operating system;
    instruction means for determining whether each of said plurality of security requirements is met utilizing said plurality of system parameters and said plurality of user values, wherein said operating system is secure in response to said plurality of security requirements being met;
    instruction means for determining a secure value for each of said plurality of user values;
    instruction means for determining a current value for each of said plurality of user values;
    instruction means for determining that one of said plurality of security requirements is not met in response to said secure value being unequal to said current value for one of said plurality of user values;

instruction means for generating a notice of a security breach for said one of said plurality of security requirements; and instruction means for providing a suggested correction for said security breach wherein said suggested correction results in said current value for said one of said plurality of user values being set to said secure value for said one of said plurality of user values.

16. The computer program product according to claim 15, further comprising instruction means for generating a notice of a security breach for one of said plurality of security requirements in response to a determination that said one of said plurality of security requirements is not met.

17. The computer program product according to claim 16, wherein said instruction means for generating said notice of a security breach further comprises instruction means for reporting a security violation in response to a determination that said one of said plurality of security requirements is not met.

18. The computer program product according to claim 16, further comprising instruction means for providing a suggested correction for said security breach wherein said suggested correction results in said one of said plurality of security requirements being met.

19. The computer program product according to claim 15, further comprising instruction means for storing said plurality of system parameters in a configuration file.

20. The computer program product according to claim 15, wherein said instruction means for establishing said plurality of security requirements for utilizing said operating system further comprises instruction means for establishing a security requirement defining a valid access level of said operating system.

21. The computer program product according to claim 15, wherein said operating system being executed by said data processing system is a LINUX operating system.

* * * * *